United States Patent [19]

Tokoro

[11] Patent Number: 4,945,483
[45] Date of Patent: Jul. 31, 1990

[54] DRIVE CONTROL DEVICE FOR VEHICLE
[75] Inventor: Setsuo Tokoro, Susono, Japan
[73] Assignee: Toyota Jidosha Kabushiki Kaisha, Aichi, Japan
[21] Appl. No.: 174,900
[22] Filed: Mar. 29, 1988
[30] Foreign Application Priority Data Mar. 31, 1987 [JP] Japan .................... 62-78938

[51] Int. Cl.$^5$ .................... B60K 41/12; B60K 41/18; F16H 11/06
[52] U.S. Cl. .................... 364/424.1; 74/866; 474/12
[58] Field of Search .................... 364/424.1; 74/866; 474/11, 12, 18, 69

[56] References Cited

U.S. PATENT DOCUMENTS

| 4,637,280 | 1/1987 | Oshiage | 74/866 |
| 4,642,068 | 2/1987 | Osanai et al. | 474/11 |
| 4,649,488 | 3/1987 | Osanai et al. | 364/424.1 |
| 4,718,306 | 1/1988 | Shigematsu et al. | 364/424.1 |
| 4,720,793 | 1/1988 | Watanabe et al. | 364/424.1 |
| 4,736,301 | 4/1988 | Osanai | 364/424.1 |
| 4,743,223 | 5/1988 | Tokoro et al. | 474/69 |

Primary Examiner—Felix D. Gruber
Attorney, Agent, or Firm—Oliff & Berridge

[57] ABSTRACT

In a continuously variable transmission, a target vehicle driving torque is obtained according to engine load, and a target rotational value of the continuously variable transmission possible to output the target vehicle driving torque is determined from a vehicle speed and an engine torque at that time. The target rotational value may be a target rotational speed of an input shaft of the continuously variable transmission, or, a target speed ratio between a rotational speed of an output shaft and a rotational speed of the input shaft. As a result, the target rotational value to which a driver's intention is properly reflected can be set irrespective of condition, i.e., a normal running condition or a speed change transitional condition. Further, it is unnecessary to provide a device such as a throttle actuator for controlling an engine output independently of an accelerator pedal.

17 Claims, 8 Drawing Sheets

DRIVE CONTROL DEVICE FOR VEHICLE

BACKGROUND OF THE INVENTION

The present invention relates to an improvement in a drive control device for a vehicle having a continuously variable transmission designed to continuously control a speed ratio defined as the ratio of rotational speed of an output shaft of the continuously variable transmission over the rotational speed of an input shaft thereof.

In the past, belt-driven continuously variable transmissions have been used as automatic transmissions for vehicles. In general, these continuously variable transmission mechanisms have V-shaped pulley devices, each including a stationary pulley and a movable pulley which cooperate to create an effective diameter which is variable. Hydraulic servo devices are used to move the movable pulley. The V-shaped pulley devices are provided on input and output shafts with a driving belt extending therebetween so that rotation of the input shaft can be transferred to the output shaft. Normally, an oil flowrate to the hydraulic servo device on the input side is adjusted by a flow control valve, whereby the effective diameter of the V-shaped pulley device on the input side is changed. The hydraulic pressure of the hydraulic servo device on the output side is varied by a pressure control valve to thereby follow the change of the effective diameter of the V-shaped pulley device on the input side, so that the driving belt does not slip in transmitting the torque.

As compared with an automatic transmission mechanism consisting of a torque converter with groups of planetary gear units, the above-described continuously variable transmission mechanism is advantageous in that it permits abrupt changes in driving force during running of the vehicle, shift shocks are low, and the fuel consumption rate is good. In recent years, demand has increased for further improvements in continuously variable transmission mechanisms.

However, all of the techniques in the prior art yet have some problems to be improved.

Japanese Patent Laid-Open No. 57-161346 (corresponding to U.S. Pat. No. 4,543,077), for example, discloses a technique of controlling the speed ratio of the continuously variable transmission so that an engine speed corresponds to a throttle opening or a vacuum value of an intake manifold. In this method, the speed ratio is controlled in consideration of engine operating conditions (optimum fuel consumption line that minimizes a fuel consumption rate, for example). Therefore, there is a problem that a driver's will is hard to represent especially at a transitional shifting state of the vehicle. For instance, even when the driver increases a depression rate of an accelerator pedal from 10% to 20% to desire that a vehicle driving torque is increased from 10 kgm to 50 kgm, such a desired driving torque of the vehicle cannot be obtained because an engine output depends on the above-mentioned engine operating conditions which are predetermined. Accordingly, it is difficult to make drive control characteristics follow an acceleration performance desired by the driver.

Figure 11:
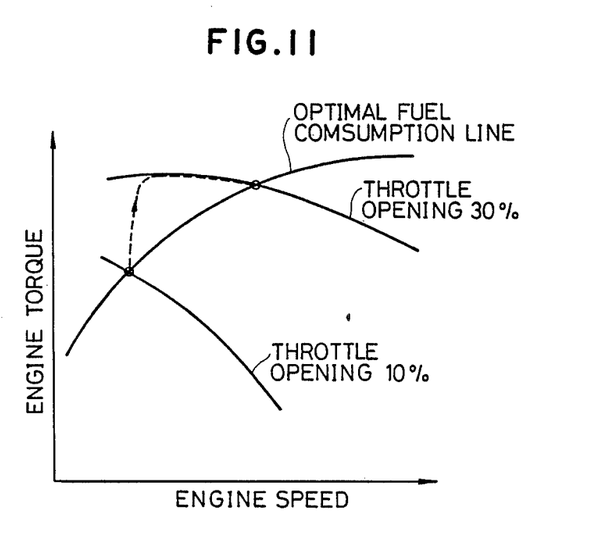
FIG. 11 is a graph showing the prior art disclosed in Japanese Patent Laid-Open No. 58-39870 (corresponding to U.S. Pat. No. 4,515,040).

There is disclosed another method in Japanese Patent Laid-Open No. 58-39870 (corresponding to U.S. Pat. No. 4,515,040). Under a normal running condition (non-shifting condition), the vehicle runs on the optimum fuel consumption line. While under a transitional shifting condition, since the response of shifting of the continuously variable transmission is slower than that of a throttle actuator, an actual output follows a broken line as shown in FIG. 11, resulting in isolation from the optimum fuel consumption line to improve the running property as compared with the previous method of Japanese Patent Laid-Open No. 59-32642 (corresponding to U.S. Pat. No. 4,458,561). However, the engine operation shown by the broken line in FIG. 11 is obtained at the transitional shifting state, but an output of engine at this state cannot be arbitrarily controlled. Consequently, it is difficult to set the output to a desired value at the transitional shifting state.

SUMMARY OF THE INVENTION

The present invention was developed to obviate the abovedescribed disadvantages and drawbacks of the prior art. Accordingly, it is an object of the present invention to provide a drive control device for a vehicle which can make the control characteristics of the drive system accord with the running characteristics desired by the driver with a simple construction and a reduced cost.

To achieve the above-described object, a first aspect of the present invention contemplates that, in a drive control device for a vehicle having a continuously variable transmission designed to continuously control a speed ratio between an input shaft and an output shaft; the device comprises means for detecting engine load of an engine to be used in combination with the continuously variable transmission, means for detecting a vehicle speed of the vehicle, means for determining engine torque of the engine, means for detecting an actual rotational value of the continuously variable transmission, means for determining a target vehicle driving torque according to at least the engine load, means for determining a target rotational value of the continuously variable transmission according to at least the target vehicle driving torque, the vehicle speed and the engine torque, and means for feedback controlling the actual rotational value of the continuously variable transmission so that the actual rotational value becomes the target rotational value.

Generally in controlling the continuously variable transmission, the speed ratio between the input shaft and the output shaft, or the rotational speed of the input shaft is conventionally controlled. In the case of controlling the speed ratio, the target rotational value and the actual rotational value of the continuously variable transmission may be equal to a target speed ratio and an actual speed ratio between the input shaft and the output shaft, respectively. In the case of controlling the rotational speed of the input shaft, the target rotational value and the actual rotational value of the continuously variable transmission may be equal to a target rotational speed and an actual rotational speed of the input shaft, respectively.

Further, to achieve the above-described object, a second aspect of the present invention contemplates that, in a' drive control device for a vehicle having a continuously variable transmission designed to continuously control a speed ratio between an input shaft and an output shaft; the device comprises means for detecting engine load of an engine to be used in comination with the continuously variable transmission, means for determining an engine torque of the engine, means for detecting an actual rotational value of the continuously variable transmission, means for determining a target vehicle horsepower according to at least the engine load, means for determining a target rotational value of the continuously variable transmission according to at least the target vehicle horsepower and the engine torque, and means for feedback controlling the actual rotational value of the continuously variable transmission so that the actual rotational value becomes the target rotational value.

In the first aspect of the present invention, the target vehicle driving torque is determined according to at least the engine load. The engine load may be determined by detecting an accelerator opening, engine throttle opening, engine intake manifold pressure, engine fuel injection quantity, engine intake air quantity, etc. Then, the target rotational value of the continuously variable transmission possible to output the target vehicle driving torque is determined based on the vehicle speed and the engine torque at that time. As a result, the driver's intention can be properly reflected on the target rotational value not only at the normal running state but also at the transitional shifting state. Furthermore, since it is only necessary to detect the actual rotational value of the continuously variable transmission and to feedback control the same so that the actual rotational value becomes the target rotational value, the control system of the engine and the continuously variable transmission can be simplified. Moreover, it is unnecessary to provide a device such as a throttle actuator for controlling the engine output independently of the accelerator pedal.

In the second aspect of the present invention, the target vehicle horsepower is determined according to at least the engine load, and the target rotational value of the continuously variable transmission possible to output the target vehicle horesepower is calculated based on the engine torque at that time. As a result, the driver's will can be also reflected on the target rotational value in the same manner as with the first aspect. Furthermore, since it is only necessary to feedback control one rotational value, the control system of the engine and the continuously variable transmission can be simplified. Moreover, it is unnecessary to provide an engine output control means such as a throttle actuator.

Although a degree of reflection of the driver's intention in the second aspect of the present invention is slightly lower than that in the first aspect, the structure is simplified slightly more than that in the first aspect.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DESCRIPTION OF THE PREFERRED EMBODIMENTS

The present invention will be described in detail hereinafter with reference to the accompanying drawings illustrating the preferred embodiments of the present invention.

Figure 2:
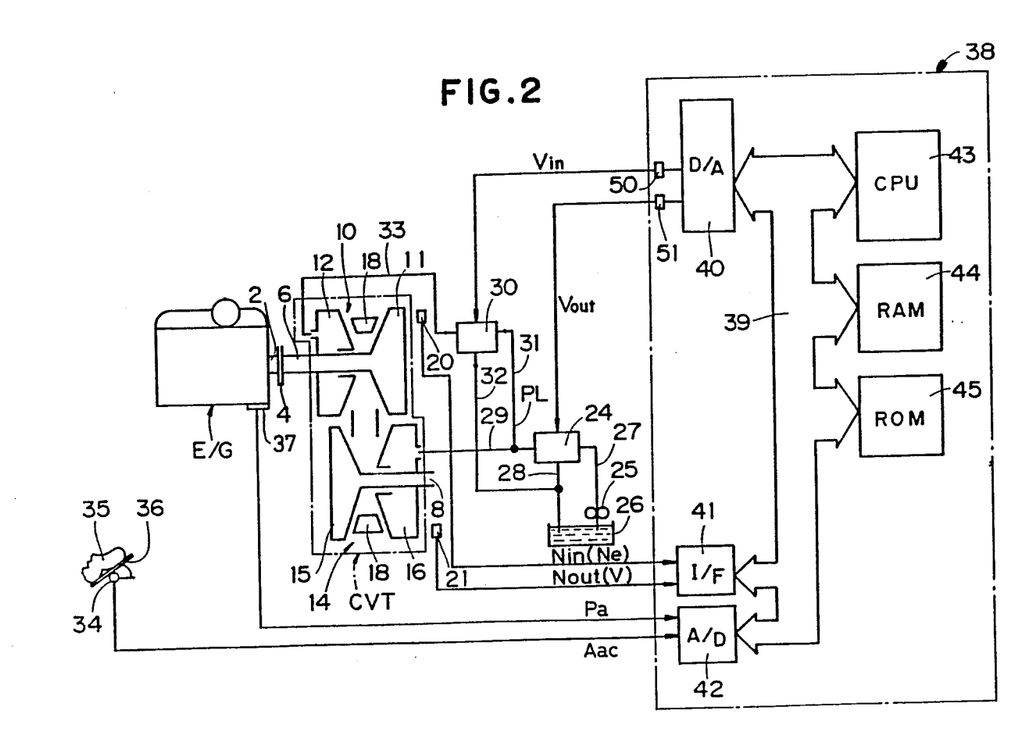
FIG. 2 is a skeleton diagram showing a general structure of an engine and continuously variable transmission' employing the first preferred embodiment of the present invention.

FIG. 2 shows a general diagram of an engine and a continuously variable transmission for a vehicle to which the preferred embodiment of the drive control device according to the present invention is applied.

Referring to the drawing, an output shaft 2 of an internal combustion engine E/G is connected to a continuously variable transmission (hereinafter referred to as a "CVT") through a clutch mechanism 4.

The CVT is provided on an input shaft 6 and an output shaft 8 with V-pulley devices 10 and 14. The V-shaped pulley 10 includes a stationary pulley 11 and a movable pulley 12, and V-shaped pulley 14 includes a stationary pulley 15 and a movable pulley 16. The stationary pulley 11 on the input side is fixed to the input shaft 6, and the movable pulley 12 on the input side is axially movably coupled to the input shaft 6 through splines, ball bearings or the like. Similarly, the stationary pulley 15 on the output side is fixed to the output shaft 8 and the movable pulley 16 on the output side is axially movably coupled to the output shaft 8 through splines, ball bearings or the like. Pressure receiving areas of the respective movable pulleys 12 and 16 are set such that the area on the input side is larger than that on the output side. A forcible change in the effective diameter can be made on the input side to vary the speed ratio. On the input and the output sides, movements in the axial direction of the stationary pulleys 11, 15 and the movable pulleys 12, 16 are made opposite to each other, so that a driving belt 18 is constantly guided around the input and the output shaft 6 and 8 at right angles.

Opposed surfaces of the stationary pulleys 11, 15 and the movable pulleys 12, 16 are formed on tapered plane with distances therebetween increasing radially outwardly. The driving belt 18, being an isosceles trapezoid in cross section, is extended between the V-shaped pulley devices 10 and 14 on the input and output sides. The driving belt 18 continuously varies in its contact positions in the radial direction on the pulley surfaces in accordance with the change in the clamping forces of the stationary and movable pulleys of the respective V-shaped pulley devices 10 and 14. When the contact position of the driving belt 18 in the V-shaped pulley device on the input side moves radially outwardly, the contact position of the driving belt 18 in the V-shaped pulley device on the output side moves radially inwardly, and the speed ratio e of the CVT i.e., the ratio of Nout (a rotational speed of the output shaft 8) and Nin (a rotational speed of the input shaft)) increases. In the reverse case, the speed ratio e decreses.

A driving force of the output shaft 8 is transmitted to a traction wheel by way of a planetary gear unit for switching the forward and reverse movement, gears for speed decreases, differential gears and the like which are not shown.

An accelerator opening sensor 34 is provided to detect an opening angle Aac of an accelerator pedal 36 to be depressed by a driver's foot 35. An opening angle Ath of a throttle valve of the engine E/G is controlled in connection with the opening angle Aac of the accelerator pedal 36. A pressure Pa in an intake manifold of the engine E/G is detected by an intake manifold pressure sensor 37.

Rotational angle sensors 20 and 21, on the input and output sides, detect the angles of rotation of the pulleys 11 and 16, respectively. As a result, the input shaft speed and the output shaft speed (rpm) are detected.

A pressure control valve 24 controls a spill value of oil delivered from a reservoir 26 through an oil line 27 by an oil pump 25 to an oil line 28, to thereby regulate a line pressure PL of an oil line 29. A hydraulic servo device of the movable pulley 16 on the output side is fed with the line pressure PL through the oil line 29.

A flow control valve 30 controls the flow of oil into and out of the movable pulley 12 on the input side. To maintain the speed ratio e of the CVT at a constant value, an oil line 33 is disconnected from a line pressure oil line 31, which is branched from the oil line 29, and a drain oil line 32. As a result, the axial position of the movable pulley 12 on the input side is held constant and the speed ratio e is maintained at a constant value. To increase the speed ratio e, oil is fed into the hydraulic servo device of the movable pulley 12 on the input side from the line pressure oil line 31 through the oil line 33. As a result, the clamping forces between the pulleys 11 and 12 on the input side increase, whereby the contact positions of the driving belt 18 on the surfaces of the pulleys 11 and 12 on the input side move radially outwardly, so that the speed ratio e increases. On the contrary, to decrease the speed ratio e, oil in the hydraulic servo device of the movable pulley 12 on the input side is drained through the drain oil line 32, whereby the clamping forces between the pulleys 11 and 12 on the input side decrease. The oil pressure in the oil line 33 is not greater than the line pressure PL. However, as described above, the pressure receiving area of the hydraulic servo device of the movable pulley 12 on the input side is set at a value larger than that of the pressure receiving area of the hydraulic servo device of the movable pulley 16 on the output side, so that the clamping force of the pulleys 11 and 12 on the input side is larger than that of the pulleys 15 and 16 on the output side.

The clamping force of the pulleys 11 and 12 on the input side is varied by the flow control valve 30, thus changing the effective diameter between the pulleys 11 and 12 on the input side while the line pressure PL is regulated by the pressure control valve 24 so that the clamping forces are generated between the pulleys 15 and 16 on the output side. The change in effective diameter of the output side pulley follows the change in the effective diameter on the input side, so that the torque can be transferred without slip of the driving belt.

An electronic control unit 38 includes a D/A converter 40, input interface 41, an A/D converter 42, a CPU 43, a RAM 44 and a ROM 45, which are connected to each other by an address data bus 39. Analog outputs from the accelerator opening sensor 34 and intake manifold pressure sensor 37 are delivered to the A/D converter 42, and pulses from the rotational angle sensors 20 and 21 are delivered to the input interface 41. The control voltages Vin and Vout to the flow control valve 30 and the pressure control valve 24 are delivered from the D/A converter 40 through amplifiers 50 and 51, respectively. The speed ratio e is linearly changed with a change in input current to the amplifier 50, and the line pressure PL is linearly changed with a change in input voltage to the amplifier 51. Even when an input current to the pressure control valve 24 is zero, the line pressure PL is maintained at a predetermined value PL1 other than zero. Accordingly, even if the electronic control unit 38 were troubled, a predetermined oil pressure would be supplied to the hydraulic servo devices of the movable pulleys 12 and 16, thus ensuring a minimum torque transmission in the CVT.

Figure 1:
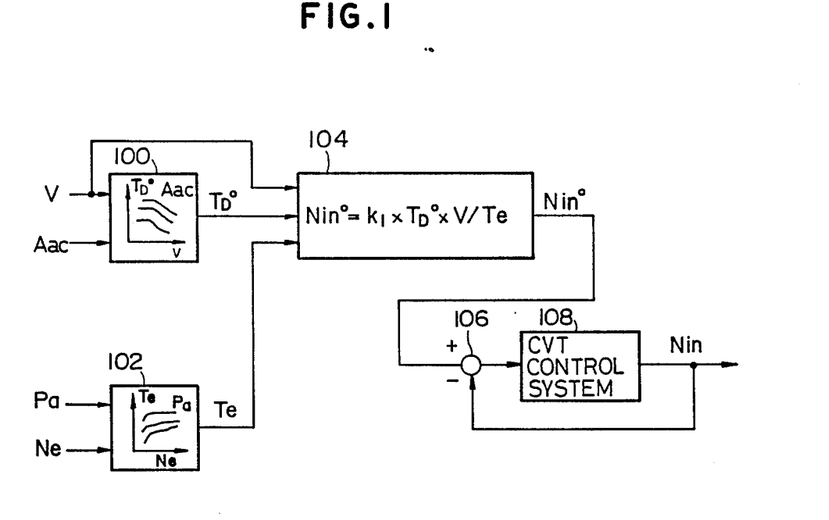
FIG. 1 is a block diagram of the drive control device for the vehicle of a first preferred embodiment according to the present invention.

FIG. 1 shows a block diagram of a control system in the above-described device. A block 100 designates a calculating unit for calculating a target vehicle driving torque TD° based on an accelerator opening Aac and a vehicle speed V by way of the following equation or a map.

$$TD° = f1(V, Aac) \tag{1}$$

A qualitative tendency of this equation is shown in the block 100, for example.

A block 102 designates a calculating unit for calculating engine torque Te based on an engine speed Ne and an intake manifold pressure Pa by way of the following equation or a map.

$$Te = f2(Ne, Pa) \tag{2}$$

A qualitative tendency of this equation is shown in the block 102, for example.

A block 104 designates a calculating unit for calculating a target input rotational speed (target rotational value) Nin° of the CVT based on the target vehicle driving torque TD°, the vehicle speed V and the engine torque Te by way of the following equation or a map.

$$Nin° = k1 \times TD° \times V/Te \tag{3}$$

In the above equation and the following equations, k stands generally for a constant.

The reason why the target input rotational speed Nin° of the CVT can be obtained by the above equation is as follows:

A requisite horsepower PSv at an output axle of CVT is obtained by the following equation.

$$PSv = k11 \times TD° \times V \tag{A}$$

A horsepower PSE to be output from an engine is obtained by the following equation.

$$PSE = k12 \times Ne \times Te \tag{B}$$

In order to output the target vehicle driving torque TD°, the engine speed Ne should be determined to equalize equation (A) to equation (B). Accordingly, the following equation (C) is obtained.

$$PSv = PSE \qquad (C)$$
$$= k11 \times TD° \times V$$
$$= k12 \times Ne \times Te$$

The engine speed Ne is found by the equation (C) to give the following equation.

$$Ne = (k11/k12) \times (TD°/Te) \times V \qquad (D)$$

Accordingly, the target input rotational speed Nin° of the CVT is to be set in the right side of the equation (D) and is controlled so that the engine speed Ne satisfies the equation (D). Except a semi-engaged clutch condition, the engine speed Ne is equal to an input rotational speed Nin of the CVT. Therefore, the following equation (E) may be substituted for the equation (D).

$$Nin° = (k11/k12) \times (TD°/Te) \times V \qquad (E)$$

By substituting k11 for the constant k11/k12 in the equation (E), the previous equation (3) is given. Accordingly, by using the equation (3), the target input rotational speed Nin° of CVT can be obtained from the target vehicle driving torque TD°, the vehicle speed V and the engine torque Te.

As Totalizing point 106 and a block 108 designate a feedback control system for controlling the speed ratio e of the CVT. Point 106 determines a difference between Nin° and Nin, which difference is input to control system block 108. The control system controls voltage Vin to the flow control valve 30 so that an actual input rotational speed Nin of the CVT is equalized to the target input rotational speed Nin°, to control the speed ratio e of the CVT. The control system may employ the following equation (4), for example.

$$Vin = k2(Nin - Nin°) \qquad (4)$$

Figure 3:
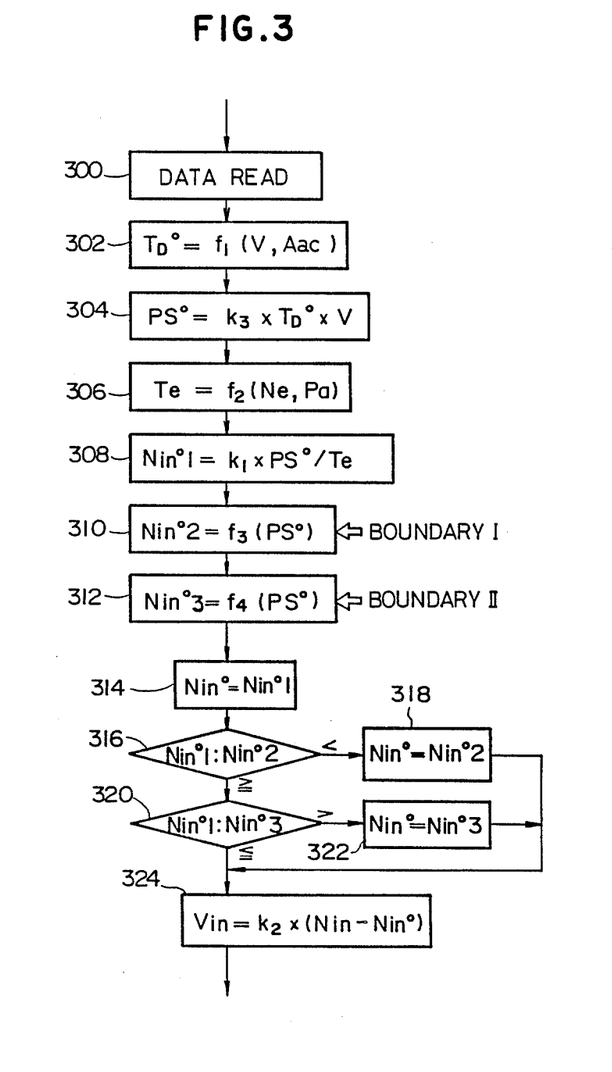
FIG. 3 is a flow chart of the control routine in the preferred embodiment.
Figure 4:
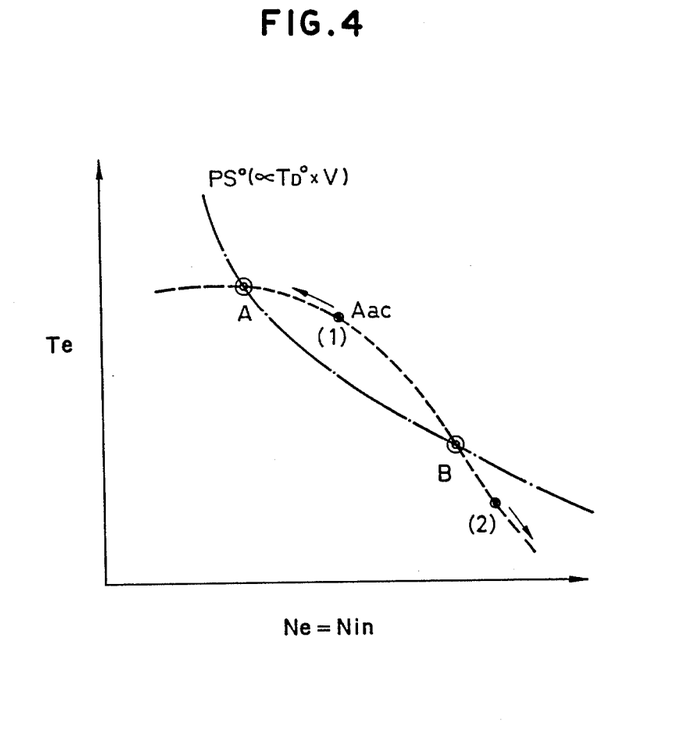
FIGS. 4 to 6 are graphs showing the trouble to be generated in determining the target vehicle driving torque (target vehicle horsepower) when the accelerator opening is used as an engine load factor.

FIG. 3 shows a control flow wherein the control is conducted by the above-mentioned device in the arithmetic order. In this embodiment described herein, a plurality of steps 308–322 are executed so as to obtain the target input rotational speed Nin°. This is due to the following reason. Referring to FIG. 4, a vehicle running condition varies to lie on a point (1) or (2), for example, even at the same accelerator opening Aac and the same vehicle speed V. When the vehicle running condition lies on the point (1), it is converged to a point A. On the other hand, when the vehicle running condition lies on the point (2), it is diverged from a point B to a point at infinity. This will now be described in more detail with reference to FIGS. 5 and 6.

Figure 5:
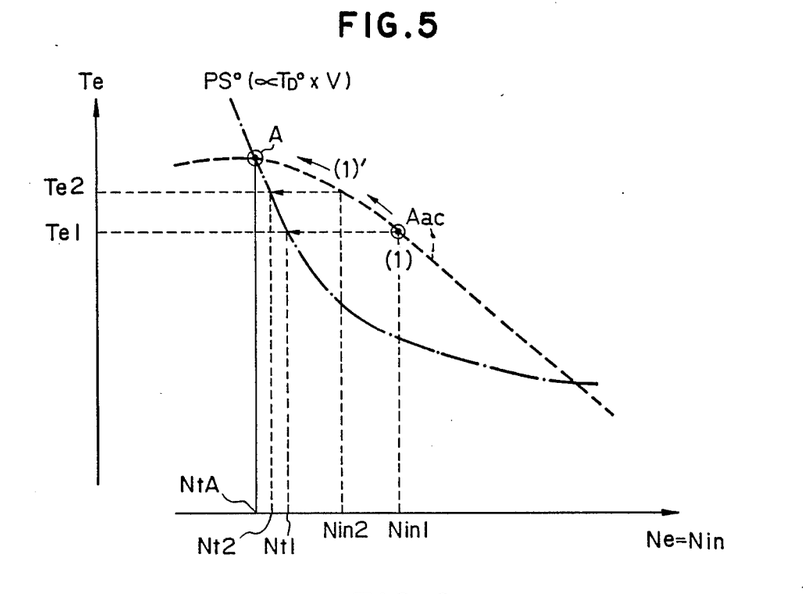

Referring to FIG. 5, when the vehicle running condition lies on the point (1), the target input rotational speed Nin° is obtained by the following equation, where PS° stands for a target vehicle horesepower.

$$Nin° = Nt1 = k4 \times PS°/Te1 \qquad (5)$$

Where PS° is in proportion to TD°×V, Te1 stands for an engine torque at the point (1); and Nt1 stands for a tentative target input rotational speed. Let Nin1 be an input rotational speed at the point (1) and NtA be a target input rotational speed at the point A, NtA<Nt-1<Nin1 holds as will be apparent from FIG. 5, and the input rotational speed Nin approaches from Nin1 at the point (1) toward the side of the final target value NtA by taking the tentative target value Nt1. Assuming that the accelerator opening Aac is fixed (namely, assuming that the target vehicle horsepower PS° is not varied due to a change in vehicle speed), the vehicle running condition will have been shifted from the point (1) to a point (1)′ after a certain time is elapsed. The target input rotational speed Nin° at the point (1)′ is obtained by the following equation.

$$Nin° = Nt2 = k4 \times PS°/Te2 \qquad (6)$$

As will be appreciated from FIG. 5, NtA<Nt-2<Nin2 holds, and the input rotational speed Nin further approaches from Nin2 at the point (1)′ toward the side of the final target value NtA by taking the tentative target value Nt2. Such operations are repeated, and the input rotational speed Nin is finally converged to NtA (point A).

Figure 6:
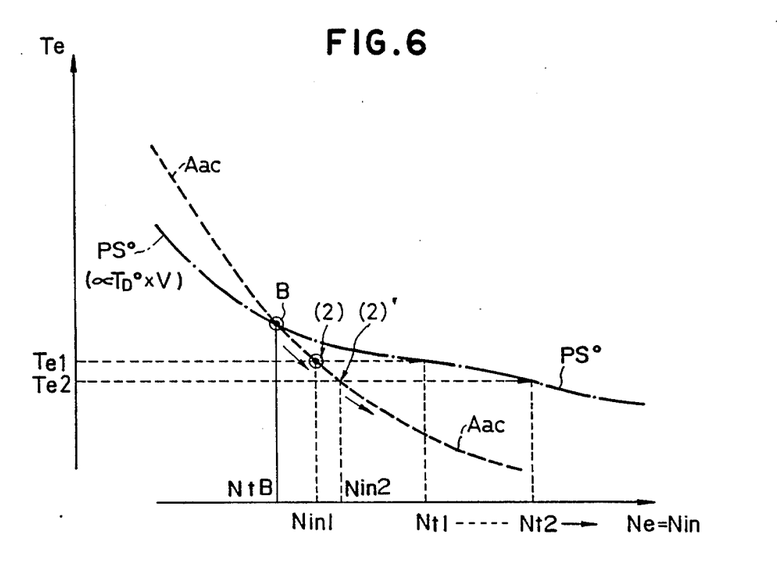

However, when the vehicle running condition initially lies on the point (2) as shown in FIGS. 4 and 6, if the target input rotational speed Nin° is obtained by an equation similar to the equation (5), then NtB<Nin-1<Nt1 holds. Accordingly, the input rotational speed Nin moves away from Nin1 at the point (2) toward the opposite side of the final target value NtB by taking the tentative target value Nt1. As a result, after a certain time is elapsed, the vehicle running condition will have been shifted from the point (2) to a point (2)′. However, also at the point (2)′, if Nin° is obtained by an equation like the equation (6), then NtB<Nin2<Nt2 holds as apparent from FIG. 6. Accordingly, the input rotational speed Nin leaves Nin2 at the point (2)′ by taking the tentative target value Nt2 and moves farther away from the final target value NtB. As a result, when the vehicle running condition initially lies on the point (2), the actual input rotational speed Nin moves away from the desired target value NtB (point B) to a point at infinity.

Such a trouble as mentioned above tends to occur when the accelerator opening Aac is employed as an engine load in obtaining the target vehicle driving torque TD°, as in this embodiment. In order to eliminate the trouble, the first preferred embodiment executes the steps 308–322.

Referring back to FIG. 3, various data are read in step 300, and the target vehicle driving torque TD° is obtained as a function f1 of the vehicle speed V and the accelerator opening Aac in step 302.

In step 304, the target vehicle horsepower PS° corresponding to a part of the right side of the equation (3) is calculated. In step 306, the engine torque Te is obtained by the equation (2).

Steps 308–322 are steps for preventing the divergence of the target input rotational speed Nin°. That is, in these steps, the logic mentioned with reference to FIG. 1 is applied to only a region surrounded by the boundaries I and II shown in FIG. 7, and in any region outside this region, the boundaries I or II in itself is set as a target line.

Figure 7:
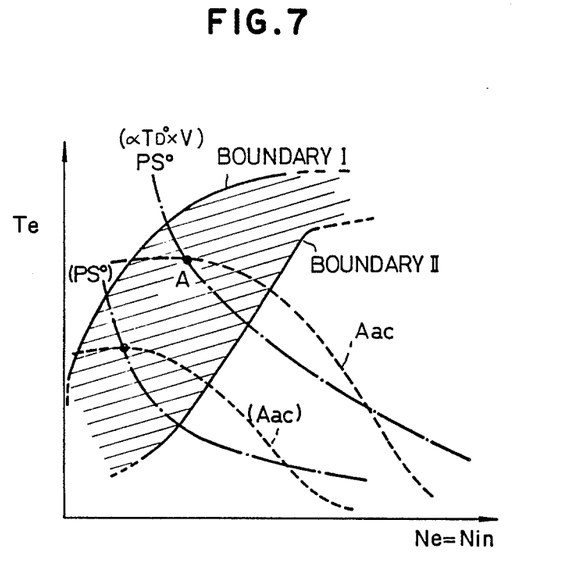
FIG. 7 is a graph showing a first method for eliminating the trouble mentioned with reference to FIGS. 4–6 which method is applied to the control flow chart shown in FIG. 3.

In step 308, a target input rotational speed Nin°1 is calculated according to the equation (3), and in steps 310 and 312, lower and upper limits Nin°2 and Nin°3 of Nin° corresponding to the boundaries I and II are defined, respectively. The Nin°2 and Nin°3 are defined according to the target vehicle horesepower PS° obtained in step 304.

In step 314, Nin°1 calculated according to the equation (3) in step 308 is set as the target input rotational speed Nin°. When Nin°1 is in the range of Nin°3≧Nin°1≧Nin°2 in steps 316 and 320, the target input rotational speed Nin°1 is employed as it is. However, if Nin°1 is smaller than Nin°2, Nin°2 is substituted for Nin°1 (step 318), while if Nin°1 is greater than Nin°3, Nin°3 is substituted for Nin°1 (step 322). The target input rotational speed Nin° thus obtained is never diverged irrespective of the accelerator opening Aac.

In step 324, the control voltage Vin to the flow control valve 30 for controlling the speed ratio e of the CVT is obtained according to the equation (4).

Figure 2A:
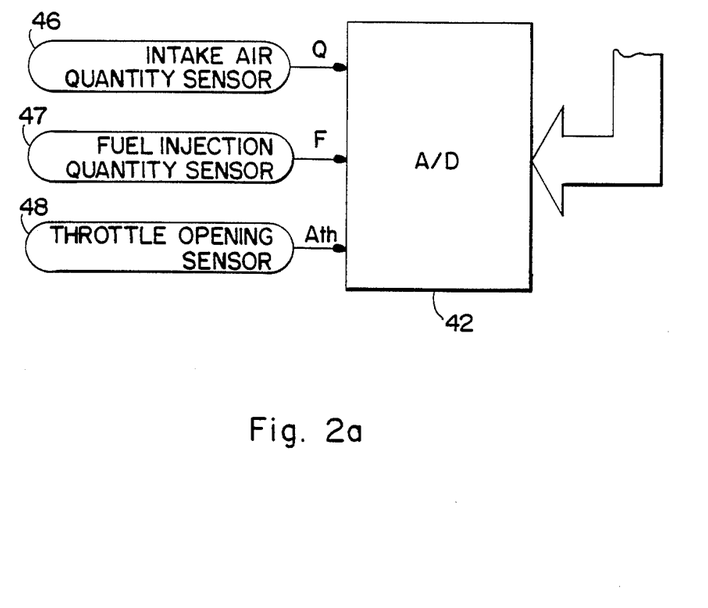
FIG. 2a is a partial skeleton diagram depicting additional sensor inputs which may be incorporated into embodiments of the invention.
Figure 8:
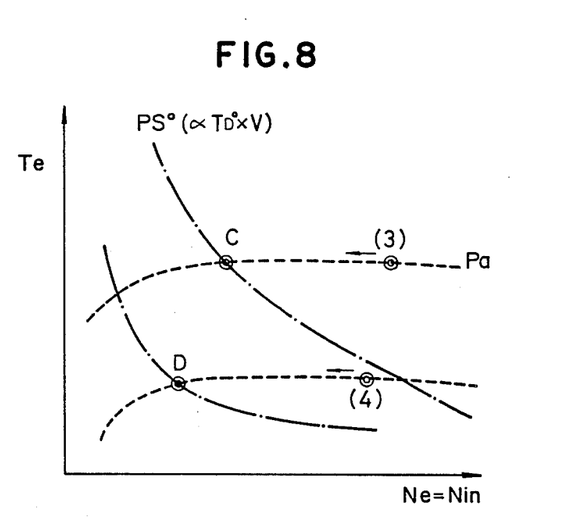
FIG. 8 is a graph showing a second method for eliminating the trouble mentioned with reference to FIGS. 4–16.

As another method for eliminating the above trouble mentioned with reference to FIGS. 4 to 6, it is considered to use any factors indicative of an engine load instead of the accelerator opening Aac in the block 100, for example, intake manifold pressure Pa, intake air quantity Q, fuel injection quantity F, etc. See FIG. 2a depicting additional sensors 46–48 which may be incorporated in lieu of or in addition to the sensor inputs Pa and Aac to A/D converter 42 in FIG. 2. These factors hardly cause these troubles. In the case of using the intake manifold pressure Pa for the factor indicative of the engine load, as shown in FIG. 8, even when the vehicle running condition lies on the points (3) or (4), the target value is always converged to point C and D, respectively, and the divergence of the target value is very unlikely to occur. However, since the intake manifold pressure Pa (or intake air quantity Q, fuel injection quantity F) changes with the result that the accelerator opening Aac is changed by a driver, there remains another problem that the responsiveness to the driver's intention is bad, and the driver's intention is not always properly reflected.

Figure 9:
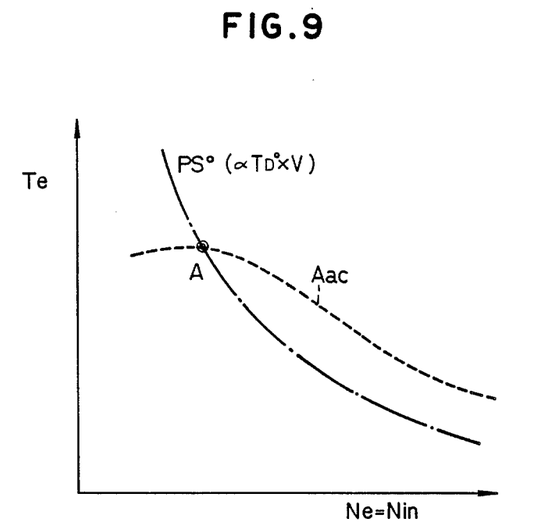
FIG. 9 is a graph showing a third method for eliminating the trouble mentioned with reference to FIGS. 4–6f

As a further method for eliminating the trouble mentioned with reference to FIGS. 4 to 6, it is considered to preliminarily adjust the relation between the accelerator opening angle Aac and the target vehicle horsepower PS° (which is in proportion to target vehicle driving torque TD°×vehicle speed V), or the relation between the accelerator opening Aac and the engine torque Te, for example, as shown in FIG. 9, so as not to generate the trouble. However, as the engine torque Te obtained according to the relation as adjusted above is not always partially precise, it is preferable to differentiate this engine torque Te from an engine torque to be used for the purpose of another control and to use the engine torque Te only for the line pressure control in the CVT.

A further method for eliminating the trouble mentioned with reference to FIGS. 4 to 6 is to use an engine torque instead of the accelerator opening Aac in the block 100. This engine torque may be an actual output from a torque sensor, or it may be a calculated output to be obtained according to the equation (2), for example.

Incidentally, if the engine torque Te is approximated to a value very close to zero or smaller than zero in the equation (3), there is a possibility that the target input rotational speed Nin° is approximated to infinity or becomes negative. This problem may be avoided by inserting after step 306 a step for setting the engine torque Te to a predetermined positive constant Tep if the former (Te) is smaller than the latter (Tep).

Further, if the target vehicle driving torque TD° becomes negative, the absolute value of TD° may be used.

In the case that the target input rotational speed Nin° exceeds allowable engine speed, or exceeds upper and lower limits of the range of the speed ratio of the CVT, it is further preferable to insert a step for avoiding the problems before step 324.

Figure 10:
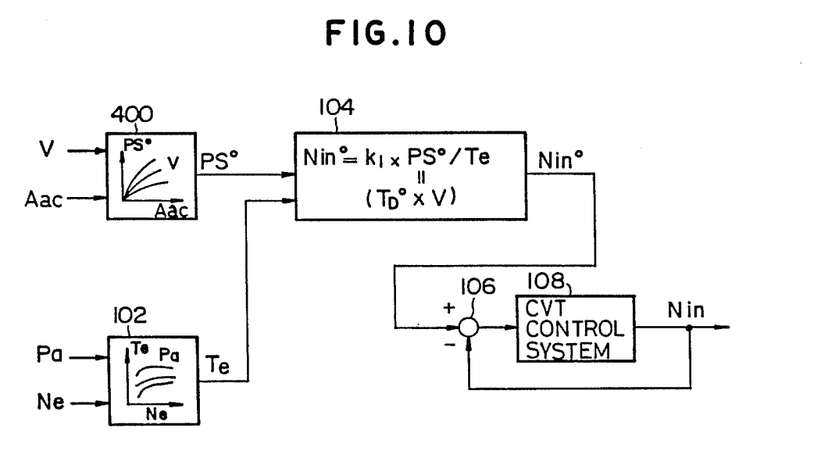
FIG. 10 is a block diagram similar to FIG. 1, showing a second preferred embodiment of the present invention.

Although the above-mentioned embodiment utilizes the target vehicle driving torque TD° for a target value to which the driver's will is reflected (first invention), the target vehicle horsepower PS° may be used as the target value (second invention). FIG. 10 shows a block diagram of a second preferred embodiment of the present invention. This embodiment obtains the target vehicle horsepower PS° according to the vehicle speed V and the accelerator opening Aac. A qualitative relation among the vehicle speed V, the accelerator opening Aac, and the target vehicle horespower PS° is shown in the block 400, for example. The other parts are basically the same as those of the first embodiment, and therefore the same numerals as in FIG. 1 denote the same parts and the explanation thereof is omitted.

Further, the speed ratio e (Nout/Nin) may be substituted for the input rotational speed Nin as an actual rotational value for controlling the CVT. In this case, a target speed ratio e° is obtained by the following equation.

$$e° = k5 \times V/Nin° \tag{7}$$

Although the target vehicle driving torque TD° and the target vehicle horsepower PS° are obtained as a function of the accelerator opening Aac and the vehicle speed V in the previous embodiments, these may be obtained as a function of the accelerator opening Aac only (or, as a function of the other factors indicative of engine load only). On the contrary, the target vehicle driving torque TD° and the target vehicle horsepower PS° may be decided in consideration of the other factors including an engine cooling water temperature, vehicle weight, slope gradient, and external switches (economy running pattern/power running pattern selecting switch, etc.) in addition to the accelerator opening angle Aac and the vehicle speed V.

The feedback control of the CVT may include correction according to an oil temperature, and may use a more precise arithmetic equation.

Further, although the engine torque Te is obtained as a function of the engine speed and the intake manifold pressure Pa in the previous embodiments, the intake manifold pressure Pa may be replaced by the other factors indicative of engine load such as the accelerator opening Aac, throttle opening Ath, intake air quantity Q and fuel injection quantity F, the latter three inputs being depicted in FIG. 2a. The relationship between these factors and the engine torque may be preset in an equation or a map according to an actual relation for every vehicle. Naturally, an actual value from a torque sensor or the like may be used.

What is claimed is:

1. A drive control device for a vehicle having a continuously variable transmission designed to continuously control a speed ratio between an input shaft and an output shaft; said drive control device comprising:

means for detecting engine load of an engine to be used in combination with said continuously variable transmission;

means for detecting a vehicle speed of said vehicle;

means for determining an engine torque of said engine;

means for detecting an actual value related to an operation of said continuously variable transmission;

means for determining a target vehicle driving torque according to at least said engine load;

means for determining a target value related to an operation of said continuously variable transmission according to at least said target vehicle driving torque, said vehicle speed and said engine torque; and means for feedback controlling said actual value of said continuously variable transmission so that said actual value becomes said target value.

2. The drive control device as set forth in claim 1, wherein,
   an accelerator opening detecting means is used as said engine load detecting means.

3. The drive control device as set forth in claim 1, wherein,
   an accelerator opening detecting means is used as said engine load detecting means, and
   the relationship between said accelerator opening and at least one of said target vehicle driving torque, said vehicle speed and said engine torque is corrected so that said target value is always determined from said accelerator opening without being diverged.

4. The drive control device as set forth in claim 1, wherein
   an intake manifold pressure detecting means is used as said engine load detecting means.

5. The drive control device as set forth in claim 1, wherein
   an intake air quantity detecting means is used as said engine load detecting means.

6. The drive control device as set forth in claim 1, wherein
   a fuel injection quantity detecting means is used as said engine load detecting means.

7. The drive control device as set forth in claim 1, wherein said engine torque determining means is used as said engine load detecting means.

8. The drive control device as set forth in claim 1, further comprising means for detecting an engine speed and wherein said engine load detecting means includes
   means for detecting at least one of intake manifold pressure, accelerator opening, engine throttle opening, engine intake air quantity and engine fuel injection quantity, and
   wherein said engine torque determining means includes means for calculating said engine torque depending on said engine speed and at least one of said intake manifold pressure, said accelerator opening, said engine throttle opening, said engine intake air quantity and said engine fuel injection quantity.

9. The drive control device as set forth in claim 1, wherein a predetermined positive lower limit is set for said engine torque to be obtained by said engine torque determining means.

10. The drive control device as set forth in claim 1, wherein said target vehicle driving torque determining means uses an absolute value of said target vehicle driving torque when said calculated target vehicle driving torque becomes negative.

11. The drive control device as set forth in claim 1, wherein an upper limit is set for said target value so as to prevent an engine speed from exceeding an allowable engine speed.

12. The drive control device as set forth in claim 1, wherein upper and lower limits are set for said target value so as to prevent a range of said speed ratio of said continuously variable transmission from exceeding an upper and a lower limit.

13. The drive control device as set forth in claim 1, wherein said target value and said actual value related to an operation of said continuously variable transmission are, respectively, a target rotational speed and an actual rotational speed of said input shaft of said continuously variable transmission.

14. The drive control device as set forth in claim 1, wherein said target value and said actual value related to an operation of said continuously variable transmission includes a target value and an actual value of a speed ratio of said continuously variable transmission.

15. The drive control device as set forth in claim 1, wherein said target vehicle driving torque determining means obtains said target vehicle driving torque according to said engine load and said vehicle speed.

16. The drive control device as set forth in claim 1, wherein upper and lower limits of said target value are set depending upon said target vehicle driving torque and said vehicle speed in determining said target value.

17. A drive control device for a vehicle having a continuously variable transmission designed to continuously control a speed ratio between an input shaft and an output shaft, said device comprising:
   means for detecting engine load of an engine to be used in combination with said continuously variable transmission;
   means for determining engine torque of said engine;
   means for detecting an actual value related to an operation of said continuously variable transmission;
   means for determining a target vehicle horsepower according to at least said engine load;
   means for determining a target value of said continuously variable transmission according to at least said target vehicle horsepower and said engine torque; and
   means for feedback controlling said actual value of said continuously variable transmission so that said actual value becomes and said target value.

* * * * *